United States Patent
Guo et al.

(10) Patent No.: US 11,472,740 B2
(45) Date of Patent: Oct. 18, 2022

(54) PLANT-MIXED WARM REGENERATED ASPHALT MIXTURE AND PREPARATION METHOD THEREOF

(71) Applicant: Jiangsu Tiannuo Road Materials Co., Ltd., Jiangsu (CN)

(72) Inventors: Zhaomin Guo, Jiangsu (CN); Yuzhen Zhang, Jiangsu (CN); Hubing Xiao, Jiangsu (CN); Meng Xu, Jiangsu (CN)

(73) Assignee: Jiangsu Tiannuo Road Materials Co., Ltd., Jiangsu (CN)

( * ) Notice: Subject to any disclaimer, the term of this patent is extended or adjusted under 35 U.S.C. 154(b) by 469 days.

(21) Appl. No.: 16/304,167

(22) PCT Filed: Jul. 18, 2017

(86) PCT No.: PCT/CN2017/093284
§ 371 (c)(1),
(2) Date: Nov. 23, 2018

(87) PCT Pub. No.: WO2017/202395
PCT Pub. Date: Nov. 30, 2017

(65) Prior Publication Data
US 2020/0308052 A1    Oct. 1, 2020

(30) Foreign Application Priority Data

May 23, 2016 (CN) .......................... 201610344451.6
Dec. 13, 2016 (CN) .......................... 201611144961.5

(51) Int. Cl.
C04B 18/04 (2006.01)
C04B 26/26 (2006.01)
C08L 95/00 (2006.01)
C04B 40/00 (2006.01)
C04B 111/00 (2006.01)

(52) U.S. Cl.
CPC .............. C04B 26/26 (2013.01); C04B 18/04 (2013.01); C04B 40/0028 (2013.01); C04B 40/0046 (2013.01); C08L 95/00 (2013.01); C04B 2111/0075 (2013.01)

(58) Field of Classification Search
CPC ..... C04B 26/26; C04B 18/04; C04B 40/0046; C04B 2111/0075; C04B 40/0028; C04B 18/16; C04B 40/00; Y02A 30/30; C08L 95/00; C10C 3/00; C08K 3/26; C08K 3/34
See application file for complete search history.

(56) References Cited

U.S. PATENT DOCUMENTS

| | | | | |
|---|---|---|---|---|
| 6,074,469 A * | 6/2000 | Collins | ..................... | C08K 5/01 106/273.1 |
| 2005/0017104 A1* | 1/2005 | Packer | ................ | E01C 19/1004 241/17 |
| 2008/0310249 A1* | 12/2008 | Musil | .................. | E01C 19/1004 366/23 |
| 2011/0146539 A1* | 6/2011 | Poncelet | ............. | E01C 19/1036 106/661 |
| 2015/0329702 A1* | 11/2015 | Hwang | .................... | C08K 5/09 106/504 |

FOREIGN PATENT DOCUMENTS

| | | | | |
|---|---|---|---|---|
| CN | 101177535 | | 5/2008 | |
| CN | 101654347 | | 2/2010 | |
| CN | 101892069 A | * | 11/2010 | |
| CN | 102112557 | | 6/2011 | |
| CN | 102604401 | | 7/2012 | |
| CN | 102795812 | | 11/2012 | |
| CN | 104119032 | | 10/2014 | |
| CN | 106009719 | | 10/2016 | |
| CN | 106746926 | | 5/2017 | |
| JP | 2008056742 A | * | 3/2008 | ............... C08K 5/01 |
| WO | 2013053882 | | 4/2013 | |

OTHER PUBLICATIONS

CN104119032A_translated (Year: 2014).*
Rotimi, D. (2016). J Sci Res Engg &Tech. 1. 14-24. [Retrieved on Oct. 7, 2021 <URL: https://www.researchgate.net/publication/317336251_EFFECT_OF_THE_TEMPERATURE_ON_DYNAMIC_VISCOSITY_DENSITY_AND_FLOW_RATEOF_SOME_VEGETABLE_OILS>] (Year: 2016).*
JP-2008056742-A, machine translation (Year: 2008).*
CN-101892069-A, machine translation (Year: 2010).*
"International Search Report (Form PCT/ISA/210)", dated Sep. 27, 2017, with English translation thereof, pp. 1-6.

* cited by examiner

*Primary Examiner* — Kevin E Yoon
*Assistant Examiner* — Marites A Guino-O Uzzle
(74) *Attorney, Agent, or Firm* — JCIPRNET

(57) ABSTRACT

A preparation method of a plant-mixed warm regenerated asphalt mixture, comprises the following steps: preparing a RAP material, a new aggregate, a mineral powder, a new asphalt and a regenerant with a total mass percentage of 100%; heating and stirring the RAP material, adding the regenerant, and continuing to heat and stir; placing the product in a development bin for development, wherein a development temperature is 40° C. to 150° C., and a development time is 0.5 h to 6 h; mixing, heating and stirring a product with the new aggregate; and after mixing and heating the product with the new asphalt, adding the mineral powder, and stirring to mold. Addition of the regenerated asphalt mixture in the development process improves the regeneration effect of the old asphalt, and pavement performances of the formed regenerated asphalt mixture can fully reach that of a hot-mixed asphalt mixture produced entirely with new materials.

15 Claims, No Drawings

PLANT-MIXED WARM REGENERATED ASPHALT MIXTURE AND PREPARATION METHOD THEREOF

CROSS-REFERENCE TO RELATED APPLICATION

This application is a 371 of international application of PCT application serial no. PCT/CN2017/093284, filed on Jul. 18, 2017, which claims the priority benefit of China application no. 201610344451.6 and 201611144961.5, filed on May 23, 2016 and Dec. 13, 2016, respectively. The entirety of each of the above-mentioned patent applications is hereby incorporated by reference herein and made a part of this specification.

BACKGROUND OF THE INVENTION

1. Technical Field

The present invention relates to an asphalt mixture and a preparation method thereof, and more particularly, to a preparation method of a plant-mixed warm regenerated asphalt mixture and a regenerated asphalt mixture prepared by the method, which belongs to the field of highway engineering technologies.

2. Background

As the most common asphalt pavement recycling method used all over the world today, a plant-mixed hot recycling technology is applied to the recycling and utilization of old asphalt concrete pavements under various conditions, which not only saves a large amount of raw materials such as asphalt, sand and gravel, but also saves engineering investment and avoids new resource consumption. Meanwhile, it is beneficial for disposing waste materials and protecting the environment, thereby having significant economic benefits and social and environmental benefits.

According to the conventional plant-mixed hot regenerating process, the old asphalt mixture (referred to as RAP material) and the new aggregate are separately heated in usual, then the old material and the new aggregate are mixed in a mixing kettle, and then the new asphalt (or new asphalt and regenerant) is added into the mixing kettle for mixing at one time to obtain the finished product of the regenerated asphalt mixture which is directly used for paving. However, the conventional process has some problems: on one hand, the new aggregate and the old material in the regenerated mixture after being mixed are coated by the asphalt in different degrees; usually, the asphalt film of the new aggregate is thin, the asphalt film of the old material is thick, and the uniformity of the mixture is poor, often resulting in the phenomenon of grey materials caused by that the new aggregate with larger particle size after being mixed is still not fully coated by the asphalt; on the other hand, the new asphalt and the aged asphalt in the old material are not completely fused and evenly coated on the old and new aggregates, so that the pavement performances of the aged asphalt cannot be fully improved and recycled; moreover, the two kinds of asphalt play their original characteristics in the mixture system respectively, and cannot form a unified entirety. Therefore, the comprehensive pavement performances of the regenerated asphalt mixture are seriously affected; particularly, the water stability, low-temperature crack resistance and fatigue life, etc., are greatly reduced in comparison with the asphalt mixture using new materials entirely. In addition, the regenerant is directly added into the product of the mixture of the new aggregate and old material, many of which is adsorbed and absorbed by the new aggregate and cannot recycle the aged asphalt, thereby decreasing the effective utilization rate of the regenerant and increasing the production cost of the regenerated asphalt mixture.

Under this background, it is necessary to explore a new preparation method of a plant-mixed warm regenerated asphalt mixture.

SUMMARY OF THE INVENTION

Objects of the present invention: A first object of the present invention is to a preparation method of a regenerated asphalt mixture with simple process, good recycling effect, high regenerant utilization rate, low cost and wide application scope.

A second object of the present invention is to provide a plant-mixed warm regenerated asphalt mixture with high water-resist stability, low-temperature cracking resistance and fatigue life prepared by the method.

Technical solutions: A first preparation method of a plant-mixed warm regenerated asphalt mixture according to the present invention, i.e., method of heating first and then stirring, comprises the following steps of:

(1) preparing a RAP material, a new aggregate, a mineral powder, a new asphalt and a regenerant with a total mass percentage of 100%;

(2) heating and stirring the RAP material, adding the regenerant, and then continuing to heat and stir;

(3) placing a product of step (2) in a development bin for development, wherein a development temperature is 40° C. to 150° C., and a development time is 0.5 h to 6 h;

(4) mixing, heating and stirring a product of step (3) with the new aggregate; and (5) mixing and heating a product of step (4) with the new asphalt, adding the mineral powder, and stirring to mold.

Another preparation method of a plant-mixed hot regenerated asphalt mixture according to the present invention, i.e., method of stirring first and then general, comprises the following steps of:

(1) preparing a RAP material, a new aggregate, a mineral powder, a new asphalt and a regenerant with a total mass percentage of 100%;

(2) mixing and stirring the RAP material and the new aggregate which are respectively heated;

(3) adding the regenerant and the new asphalt into a product of step (2), and mixing, heating and stirring;

(4) adding the mineral powder into a product of step (3), and mixing, heating and stirring; and (5) placing a product of step (4) in a development bin for development, and then taking out of the bin for molding, wherein a development temperature is 40° C. to 170° C., and a development time is 0.5 h to 6 h.

The development bin comprises a storage bin, and a stirrer and a heater arranged therein, a volume of the storage bin is 1 to 5000 tons, and a heating method of the heater is one of heat-transfer oil, electric heating or flue discharges of an asphalt mixing plant.

According to the present invention, the RAP material is 20 to 85%, the new aggregate is 10 to 70%, the mineral powder is 0 to 8%, the new asphalt is 0.5 to 5% and the regenerant is 0 to 0.5% by the mass percentage. The material proportions can be adjusted randomly as long as the total sum is 100%.

The RAP material is a waste produced or milled during the process of maintenance and reconstruction after the end of the life cycle of an asphalt pavement. The new aggregate is made of pavement crushed stones, which is synthesized by a variety of single aggregates with different particle sizes according to the requirements set forth in "Technical Specifications for Construction of Highway Asphalt Pavement". The new asphalt can be grade-A pavement petroleum asphalt; and the mineral powder can be limestone mineral powder. The regenerant is an additive externally purchased for reducing an asphalt binder in waste asphalt pavement materials. The WRA-1 regenerant independently developed and sold by the applicant (Jiangsu Tiannuo Road Materials Technology Co., Ltd.), with a kinematic viscosity of (50 to 60000) mm$^2$/s at 60° C. can be used in the present invention.

After a long time of use, the asphalt binder in the asphalt pavement will become hard and brittle due to volatilization of light components such as aromatic components and saturated phenol. The object of the conventional regenerant is only to supplement the missing light components in the old asphalt binder to restore the performances of asphalt. The regenerant described in the present invention not only has the functions of the conventional regenerant, but also can modify the old asphalt binder. The performances of the regenerated asphalt binder are greatly improved, and the obtained plant-mixed warm regenerated asphalt mixture has more excellent high-temperature stability, low-temperature crack resistance, water damage resistance and fatigue life than that of the conventional regenerant.

According to the first preparation method of the present invention, in step (2), the heating temperature of the RAP material is 70 to 160° C., and the stirring time is 5 to 10 s. The heating temperature is 40 to 120° C., and the stirring time is 15 to 25 s after the regenerant is added. In step (4), the heating temperature is 90 to 190° C., and the stirring time is 10 to 15 s. In step (5), the heating temperature is 60 to 160° C., and the stirring time is 15 to 25 s.

According to the second preparation method of the present invention, in step (2), the heating temperature of the RAP material is 80 to 170° C., the heating temperature of the new aggregate is 90 to 190° C., and the stirring time is 15 to 25 s. In step (3), the heating temperature is 40 to 120° C., and the stirring time is 15 to 30 s. In step (4), the stirring time is 10 to 20 s.

The plant-mixed warm regenerated asphalt mixture of the present invention is prepared using the above-mentioned methods.

Mechanism of the present invention: according to the present invention, the new asphalt (or new asphalt and regenerant) and an aged asphalt in an old material are developed under specific temperature and time conditions to form a continuous and consistent binder after mutual permeation, exchange and fusion of the two, and the binder is restored to the performance level of the new asphalt and evenly coated on the new aggregate and the old material to obtain the regenerated asphalt mixture with stable form and excellent pavement performances.

Beneficial effects: compared with the prior art, the present invention has the obvious advantages as follows.

(1) According to the present invention, a development process of the regenerated asphalt mixture is added, which significantly increases the opportunities for mutual permeation, fusion and organic binding between the new asphalt and the old asphalt, enables the new asphalt and the regenerant to fully exert renascence and reconstruction functions in the recycled asphalt pavement material (RAP material), and improves the recycling effect of the old asphalt, and pavement performances of the regenerated asphalt mixture formed can fully reach that of a hot-mixed asphalt mixture produced entirely with new materials. Particularly, the low-temperature crack resistance, water damage resistance and fatigue life of the hot-mixed asphalt mixture are significantly better than that of the regenerated asphalt mixture produced by the conventional technologies.

(2) The method of the present invention has the advantages of easy realization, high utilization rates of aged asphalt and regenerant, less consumption of new asphalt, effective prevention of gray materials in the regenerated mixture and more uniform regenerated mixture; and the comprehensive performances like high-temperature stability, low-temperature crack resistance, water damage resistance and fatigue life are greatly improved.

(3) According to the present invention, the mixed product formed by the old material and the regenerant can be developed under specific temperature and time conditions, i.e., the regenerant is directly added to the RAP material (milling material), which is beneficial to the full contact between the regenerant and the aged asphalt in the old material, so as to be capable of improving the performances of the aged asphalt and recycling the aged asphalt to the greatest extent, thus improving the effective utilization rate of the regenerant, and saving a large amount of energy consumption and development bins.

(4) The development process of the present invention is simple and easy to master, and the plant-mixed warm regenerated asphalt mixture thus produced have greatly improved pavement performances, can be directly used for paving the middle and lower layers and wearing layers of asphalt pavements of various grades, and has obvious economic and social benefits.

DETAILED DESCRIPTION OF THE INVENTION

The present invention will be further described hereinafter in details with reference to the technical solutions.

First Embodiment

Laboratory test embodiment: old asphalt pavement crushed materials (RAP material) used in the test were materials with the same source and the same particle size specification. First, the separated and crushed RAP materials were sampled in a mixing plant, and then an asphalt content test was carried out according to T 0735 in "Test Methods of Asphalt and Asphalt Mixture for Highway Engineering" (JTG E20-2011). An oil-stone ratio of the RAP material was determined to be 4.51% by the test. The old materials in the RAP material obtained by the test were screened and the screening test results were shown in Table 1. An extraction test was carried out on the RAP materials by T 0726 in "Test Methods of Asphalt and Asphalt Mixture for Highway Engineering" (JTG E20-2011), and the old asphalt after the extraction test was recovered and detected by performance test. The detection results were shown in Table 2.

TABLE 1

Gradation Test Results of Old Material in RAP Material

| Sieve pore size (mm) | 16 | 13.2 | 9.5 | 4.75 | 2.36 | 1.18 | 0.6 | 0.3 | 0.15 | 0.075 |
|---|---|---|---|---|---|---|---|---|---|---|
| Percent by mass (%) | 100 | 99.1 | 83.6 | 56.5 | 38.9 | 22.7 | 15.4 | 12.1 | 9.0 | 7.3 |

TABLE 2

Performance Index Test Results of Old Asphalt in RAP Material

| Needle penetration at 25° C. (0.1 mm) | Softening point ° C. | Ductility at 15° C. (cm) | Viscosity at 60° C. (mm$^2$/s) |
|---|---|---|---|
| 21.6 | 63.6 | 24.9 | 1290*10$^6$ |

Basalt was used as the new aggregate, and the new aggregate contained components with four groups of particle sizes, wherein the first group of particle sizes was 0 to 2.36 mm; the second group of particle sizes was 2.36 to 4.75 mm; the third group of particle sizes was 4.75 to 9.5 mm; and the fourth group of particle sizes was 9.5 to 16.0 mm. A screening test was carried out on the four groups of aggregates, and the results are shown in Table 3. A relative density test was carried out on the four groups of aggregates, and the results were shown in Table 4.

TABLE 3

Screening Test Results of New Aggregate

| Sieve pore size (mm) | Mass percentage passing through the following sieve pores (%) | | | | | | | | | |
|---|---|---|---|---|---|---|---|---|---|---|
| | 16 | 13.2 | 9.5 | 4.75 | 2.36 | 1.18 | 0.6 | 0.3 | 0.15 | 0.075 |
| Fourth group | 100 | 88.1 | 16.5 | 0.3 | 0.3 | 0.3 | 0.3 | 0.3 | 0.3 | 0.3 |
| Third group | 100 | 100 | 92.7 | 10.0 | 2.5 | 0.5 | 0.5 | 0.5 | 0.5 | 0.5 |
| Second group | 100 | 100 | 100 | 96.2 | 7.6 | 2.0 | 0.6 | 0.6 | 0.6 | 0.6 |
| First group | 100 | 100 | 100 | 100 | 82.6 | 53.5 | 35.6 | 24 | 18.8 | 12 |

TABLE 4

Relative Density Test Results of New Aggregate

| Particle size | First group | Second group | Third group | Fourth group |
|---|---|---|---|---|
| Relative density of gross volume | 2.810 | 2.853 | 2.871 | 2.885 |
| Relative apparent density | 2.943 | 2.961 | 2.953 | 2.960 |

The screening results of limestone mineral powder were shown in Table 5, and the density was 2.720.

TABLE 5

Screening Results of Mineral Powder

| Sieve pore size (mm) | 0.6 | 0.3 | 0.15 | 0.075 |
|---|---|---|---|---|
| Mass percentage passing (%) | 100.0 | 95.9 | 93.6 | 83.4 |

Domestic No. 50 grade-A pavement petroleum asphalt was selected as the new asphalt, and the performance indexes were shown in Table 6.

TABLE 6

Detection Indexes of AH-50 Pavement Petroleum Asphalt

| Needle penetration at 25° C. (0.1 mm) | Softening point ° C. | Ductility at 15° C. (cm) | Kinematic viscosity at 60° C. (mm$^2$/s) |
|---|---|---|---|
| 52 | 53.5 | Greater than 100 | 425*10$^6$ |

WRA-1 regenerant produced by Jiangsu Tiannuo Road Materials Technology Co., Ltd., with a kinematic viscosity of 60000 mm$^2$/s at 60° C. was used as the regenerant.

Continuous dense gradation AC-13 was adopted in the plant-mixed warm regenerated asphalt mixture. According to the requirements of AC-13 synthetic gradation range in "Technical Specification for Construction of Highway Asphalt Pavement" JTG F40-2004, synthetic gradation was carried out on the RAP material, the new aggregates (four groups) and the limestone mineral powder. The synthetic gradation results were shown in Table 7.

TABLE 7

AC-13 Synthetic Gradation of Plant-mixed Warm Regenerated Asphalt Mixture

| Sieve pore size (mm) | Mass percentage passing through the following sieve pores (%) | | | | | | | | | |
|---|---|---|---|---|---|---|---|---|---|---|
| | 16 | 13.2 | 9.5 | 4.75 | 2.36 | 1.18 | 0.6 | 0.3 | 0.15 | 0.075 |
| AC-13 | 100 | 93.7 | 76.3 | 50.7 | 34.2 | 21.1 | 14.0 | 11.7 | 9.0 | 6.4 |

The foregoing RAP material was mixed with the new aggregate, the mineral powder, the new asphalt and the regenerant, wherein the mass percentages of the RAP material and various newly added materials were as follows: 47.3% of the RAP material; 20.2% of the first group of new aggregates, 9.5% of the second group of new aggregates, 4.3% of the third group of new aggregates, and 14.9% of the fourth group of new aggregates (wherein, how many groups of single aggregates forming the new aggregates were determined according to the maximum stone particle size in the regenerated mixture, for example, the AC-13 asphalt mixture in this embodiment was formed by mixing four groups of single new aggregates); 0.9% of the mineral powder; 2.69% of the new asphalt; and 0.21% of the regenerant.

The above RAP material was mixed with the new aggregate, the mineral powder, the new asphalt and the regenerant according to the preparation method of a preparation method of a plant-mixed warm regenerated asphalt mixture of the present invention, and the steps were as follows.

(1) The RAP material was heated to 160° C., and then put into a mixing kettle to premix for 5 s.

(2) The regenerant was heated to 120° C. and then put into the mixing kettle to mix with a product obtained in step (1) with a mixing time set to 20 s.

(3) A product obtained in step (2) was taken out of the kettle, divided into 10 equal parts of samples (Y0, Y0.5, Y1, Y2, Y3, Y4, Y5, Y6, Y7, Y8) and stored in a special development bin at 150° C., wherein Y0 was developed for 0 h, Y0.5 was developed for 0.5 h, Y1 was developed for 1 h, Y2 was developed for 2 h, Y3 was developed for 3 h, Y4 was developed for 4 h, Y5 was developed for 5 h, Y6 was developed for 6 h, Y7 was developed for 7 h, and Y8 was developed for 8 h.

(4) The new aggregate to 190° C., weighed and then put into the mixing kettle, and meanwhile, a product completely developed in step (3) was added into the mixing kettle, and the mixture was stirred for 10 s.

(5) The AH-50 highway petroleum asphalt heated to 160° C. and the limestone mineral powder at room temperature were weighed, added into a product obtained in step (4), and then the mixture was stirred for 20 s.

(6) 10 different samples obtained in step (5) were taken out of the kettle at 170° C. and molded into an asphalt mixture test piece, and then the pavement performances of the mixture were tested.

For each sample obtained by the above preparation method of a plant-mixed warm regenerated asphalt mixture, the high-temperature performance (Marshall stability test, dynamic stability test), low-temperature performance (low-temperature bending test), water stability (Marshall residual stability test, freeze-thaw splitting test) and fatigue life (four-point bending fatigue life test) were evaluated after the test pieces were molded indoors. The test results were shown in Table 8, Table 9, Table 10 and Table 11 respectively.

TABLE 8

High-temperature Performance Detection Results of Plant-mixed Warm Regenerated Asphalt

| Detection index | Plant-mixed warm regenerated asphalt mixture | | | | | | | | | |
|---|---|---|---|---|---|---|---|---|---|---|
| | Y0 | Y0.5 | Y1 | Y2 | Y3 | Y4 | Y5 | Y6 | Y7 | Y8 |
| Marshall stability (KN) | 8.93 | 11.39 | 11.65 | 11.28 | 12.81 | 12.96 | 13.03 | 13.57 | 13.10 | 12.02 |
| Dynamic stability (times/mm) | 2822.6 | 3236.7 | 3517.1 | 3805.0 | 3991.5 | 4126.8 | 4285.9 | 4370.2 | 4280 | 3722 |

Remarks: Y0, Y0.5, Y1, Y2, Y3, Y4, Y5, Y6, Y7 and Y8 were the samples obtained after the plant-mixed warm regenerated asphalt mixture was developed at 150° C. for 0 h, 0.5 h, 1 h, 2 h, 3 h, 4 h, 5 h, 6 h, 7 h and 8 h respectively (the same below); it was stipulated in the "Technical Specification for Construction of Highway Asphalt Pavement" JTG F40-2004 (hereinafter referred to as the Specification) that the Marshall stability should be no less than 8 KN and the dynamic stability should be no less than 3000 times/mm.

TABLE 9

Low-temperature Performance Detection Results of Plant-mixed Warm Regenerated Asphalt Mixture

| Detection index | Plant-mixed warm regenerated asphalt mixture | | | | | | | | | |
|---|---|---|---|---|---|---|---|---|---|---|
| | Y0 | Y0.5 | Y1 | Y2 | Y3 | Y4 | Y5 | Y6 | Y7 | Y8 |
| Maximum bending strain at failure (µε) | 2171.5 | 2514.2 | 2578.7 | 2681.3 | 2833.4 | 2957.0 | 3020.6 | 2917.2 | 2400.7 | 1954.3 |

Remarks: the test temperature was −10° C., and it was stipulated in the Specification that the maximum bending strain at failure should be no less than 2,300 µε.

TABLE 10

Water Stability Detection Results of Plant-mixed Warm Regenerated Asphalt Mixture

| Detection index | Plant-mixed warm regenerated asphalt mixture | | | | | | | | | |
|---|---|---|---|---|---|---|---|---|---|---|
| | Y0 | Y0.5 | Y1 | Y2 | Y3 | Y4 | Y5 | Y6 | Y7 | Y8 |
| Marshall residual stability ratio (%) | 78.1 | 81.7 | 84.0 | 87.1 | 88.5 | 90.3 | 90.6 | 87.4 | 86.1 | 81.5 |
| Freeze-thaw splitting strength ratio (%) | 72.9 | 76.2 | 79.1 | 80.5 | 81.7 | 83.9 | 85.8 | 82.9 | 74.7 | 70.0 |

Remarks: it was stipulated in the Specification that the Marshall residual stability ratio should be no less than 80%, and the freeze-thaw splitting strength ratio should be no less than 75%.

TABLE 11

Fatigue Life Detection Results of Plant-mixed Warm Regenerated Asphalt Mixture

| Detection index | Plant-mixed warm regenerated asphalt mixture | | | | | | | | | |
|---|---|---|---|---|---|---|---|---|---|---|
| | Y0 | Y0.5 | Y1 | Y2 | Y3 | Y4 | Y5 | Y6 | Y7 | Y8 |
| Four-point bending fatigue life (times) | 4398 | 6251 | 6803 | 7493 | 9418 | 10160 | 11506 | 12231 | 7605 | 4602 |

Remarks: the test temperature was 15° C., the target strain was 600 µε, the loading frequency was 10 HZ, and the test termination condition was 50%.

Second Embodiment

Laboratory test embodiment: basically the same as the first embodiment, except that the development temperatures of the warm regenerated asphalt mixture in the embodiment were 20° C., 30° C., 40° C., 70° C., 100° C., 130° C., 150° C., 170° C. and 190° C. respectively; and the development time was 6 h. The high-temperature performance, low-temperature performance, water stability and fatigue life of the plant-mixed warm regenerated asphalt mixture were investigated respectively at the development temperatures and development time described in the embodiment. The test results were shown in Table 12, Table 13, Table 14 and Table 15.

TABLE 12

High-temperature Performance Detection Results of Plant-mixed Warm Regenerated Asphalt Mixture

| Detection index | Plant-mixed warm regenerated asphalt mixture | | | | | | | | |
|---|---|---|---|---|---|---|---|---|---|
| | 20° C. | 30° C. | 40° C. | 70° C. | 100° C. | 130° C. | 150° C. | 170° C. | 190° C. |
| Marshall stability (KN) | 8.12 | 8.29 | 10.71 | 11.10 | 12.83 | 13.36 | 14.57 | 14.50 | 13.10 |
| Dynamic stability (times/mm) | 2755.1 | 2901.7 | 3409.5 | 3622.6 | 3881.7 | 4063.3 | 4307.2 | 4003 | 3380 |

Remarks: the development time was 6 h (the same below); it was stipulated in the "Technical Specification for Construction of Highway Asphalt Pavement" JTG F40-2004 (hereinafter referred to as the Specification) that the Marshall stability should be no less than 8 KN and the dynamic stability should be no less than 3000 times/mm.

TABLE 13

Low-temperature Performance Detection Results of Plant-mixed Warm Regenerated Asphalt Mixture

| Detection index | Plant-mixed warm regenerated asphalt mixture | | | | | | | | |
|---|---|---|---|---|---|---|---|---|---|
| | 20° C. | 30° C. | 40° C. | 70° C. | 100° C. | 130° C. | 150° C. | 170° C. | 190° C. |
| Maximum bending strain at failure (µε) | 1967.5 | 2118.4 | 2596.3 | 2715.8 | 2786.9 | 2844.0 | 2923.1 | 2409.5 | 1791.0 |

Remarks: the test temperature was −10° C., and it was stipulated in the Specification that the maximum bending strain at failure should be no less than 2,300 µε.

TABLE 14

Water Stability Detection Results of Plant-mixed Warm Regenerated Asphalt Mixture

| Detection index | Plant-mixed warm regenerated asphalt mixture | | | | | | | | |
|---|---|---|---|---|---|---|---|---|---|
| | 20° C. | 30° C. | 40° C. | 70° C. | 100° C. | 130° C. | 150° C. | 170° C. | 190° C. |
| Marshall residual stability ratio (%) | 79.5 | 80.9 | 82.6 | 83.7 | 87.2 | 89.1 | 91.5 | 84.8 | 78.0 |
| Freeze-thaw splitting strength ratio (%) | 70.5 | 75.8 | 77.4 | 78.3 | 80.1 | 84.7 | 85.9 | 77.3 | 68.1 |

Remarks: it was stipulated in the Specification that the Marshall residual stability ratio should be no less than 80%, and the freeze-thaw splitting strength ratio should be no less than 75%.

TABLE 15

Fatigue Life Detection Results of Plant-mixed Warm Regenerated Asphalt Mixture

| Detection index | Plant-mixed warm regenerated asphalt mixture | | | | | | | | |
|---|---|---|---|---|---|---|---|---|---|
| | 20° C. | 30° C. | 40° C. | 70° C. | 100° C. | 130° C. | 150° C. | 170° C. | 190° C. |
| Four-point bending fatigue life (times) | 4722 | 6344 | 6690 | 7810 | 9022 | 9972 | 12991 | 8192 | 4100 |

Remarks: the test temperature was 15° C., the target strain was 600 με, the loading frequency was 10 Hz, and the test termination condition was 50%.

Third Embodiment

Laboratory test embodiment: old asphalt pavement crushed materials (RAP material) used the test were materials with the same source and the same particle size specification. First, the separated and crushed RAP materials were sampled in a mixing plant, and then an asphalt content test was carried out according to T 0735 in "Test Methods Asphalt and Asphalt Mixture for Highway Engineering" (JTG E20-2011). An oil-stone ratio of the RAP material was determined to be 4.81% by the test. The old materials in the RAP material obtained by the test were screened and the screening test results were shown in Table 16. An extraction test was carried out on the RAP materials by T 0726 in "Test Methods of Asphalt and Asphalt Mixture for Highway Engineering" (JTG E20-2011), and the old asphalt after the extraction test was recovered and detected by performance test. The detection results were shown in Table 17.

TABLE 16

Gradation Test Results of Old Material in RAP Material

| Sieve pore size (mm) | 16 | 13.2 | 9.5 | 4.75 | 2.36 | 1.18 | 0.6 | 0.3 | 0.15 | 0.075 |
|---|---|---|---|---|---|---|---|---|---|---|
| Percent by mass (%) | 100 | 99.7 | 89.5 | 57.3 | 40.2 | 23.9 | 16.4 | 13.7 | 10.3 | 7.6 |

TABLE 17

Performance Index Test Results of Old Asphalt in RAP Material

| Needle penetration at 25° C. (0.1 mm) | Softening point ° C. | Ductility at 15° C. (cm) | Viscosity 60° C. (mm$^2$/s) |
|---|---|---|---|
| 22.5 | 65.0 | 23.2 | 1250*10$^6$ |

Basalt was used as the new aggregate, and the new aggregate contained components with four groups of particle sizes, wherein the first group of particle sizes was 0 to 2.36 mm; the second group of particle sizes was 2.36 to 4.75 mm; the third group of particle sizes was 4.75 to 9.5 mm; and the fourth group of particle sizes was 9.5 to 16.0 mm. A screening test was carried out on the four groups of aggregates, and the results are shown in Table 18. A relative density test was carried out on the four groups of aggregates, and the results were shown in Table 19.

TABLE 18

Screening Test Results of New Aggregate

| Sieve pore size (mm) | Mass percentage passing through the following sieve pores (%) | | | | | | | | |
|---|---|---|---|---|---|---|---|---|---|
| | 16 | 13.2 | 9.5 | 4.75 | 2.36 | 1.18 | 0.6 | 0.3 | 0.15 | 0.075 |
| Fourth group | 100 | 88.1 | 16.5 | 0.3 | 0.3 | 0.3 | 0.3 | 0.3 | 0.3 | 0.3 |
| Third group | 100 | 100 | 92.7 | 10.0 | 2.5 | 0.5 | 0.5 | 0.5 | 0.5 | 0.5 |
| Second group | 100 | 100 | 100 | 96.2 | 7.6 | 2.0 | 0.6 | 0.6 | 0.6 | 0.6 |
| First group | 100 | 100 | 100 | 100 | 82.6 | 53.5 | 35.6 | 24 | 18.8 | 12 |

TABLE 19

Relative Density Test Results of New Aggregate

| Particle size | First group | Second group | Third group | Fourth group |
|---|---|---|---|---|
| Relative density of gross volume | 2.640 | 2.663 | 6.671 | 6.685 |
| Relative apparent density | 2.713 | 2.721 | 2.713 | 2.720 |

The screening results of the limestone mineral powder were shown in Table 20.

TABLE 20

Screening Results of Mineral Powder

| Sieve pore size (mm) | 0.6 | 0.3 | 0.15 | 0.075 |
|---|---|---|---|---|
| Percent by mass (%) | 100.0 | 98.2 | 96.0 | 87.0 |

Domestic No. 70 grade-A pavement petroleum asphalt was selected as the new asphalt, and the performance indexes were shown in Table 21.

TABLE 21

Detection Indexes of AH-70 Pavement Petroleum Asphalt

| Needle penetration at 25° C. (0.1 mm) | Softening point ° C. | Ductility at 15° C. (cm) | Kinematic viscosity at 60° C. (mm$^2$/s) |
|---|---|---|---|
| 72 | 48.5 | Greater than 100 | 389*10$^6$ |

A domestic regenerant with a kinematic viscosity of 60000 mm$^2$/s at 60° C. was used as the regenerant.

Continuous dense gradation AC-13C was adopted in the plant-mixed warm regenerated asphalt mixture. According to the requirements of AC-13C synthetic gradation range in "Technical Specification for Construction of Highway Asphalt Pavement" JTG F40-2004, synthetic gradation was carried out on the RAP material, the new aggregates (four groups) and the limestone mineral powder. The synthetic gradation results were shown in Table 22.

TABLE 22

AC-13C Synthetic Gradation of Plant-mixed Warm Regenerated Asphalt Mixture

| Sieve pore size (mm) | Mass percentage passing through the following sieve pores (%) | | | | | | | | |
|---|---|---|---|---|---|---|---|---|---|
| | 16 | 13.2 | 9.5 | 4.75 | 2.36 | 1.18 | 0.6 | 0.3 | 0.15 | 0.075 |
| AC-13C | 100 | 93.9 | 77.5 | 51.3 | 35.0 | 21.7 | 15.0 | 11.8 | 9.2 | 6.7 |

The foregoing RAP material was mixed with the new aggregate, the mineral powder, the new asphalt and the regenerant according to a preparation method of a plant-mixed warm regenerated asphalt mixture of the present invention, wherein the mass percentages of the RAP material and various newly added materials were as follows: 48.66% of the RAP material; 19.46% of the first group of new aggregates, 7.71% of the second group of new aggregates, 4.87% of the third group of new aggregates, and 15.57% of the fourth group of new aggregates; 0.97% of the mineral powder; 2.45% of the new asphalt; and 0.31% of the regenerant.

The above RAP material was mixed with the new aggregate, the mineral powder, the new asphalt and the regenerant according to the preparation method of a preparation method of a plant-mixed warm regenerated asphalt mixture of the present invention, and the steps were as follows:

(1) The RAP material was heated to 160° C., the new aggregate was heated to 180° C., and then the two were put into a mixing kettle to stir for 20 s.

(2) The regenerant was heated to 100° C., the new asphalt was heated to 135° C., and then the two were put into the mixing kettle to mix with a product obtained in step (1) with a mixing time set to 25 s.

(3) The weighed mineral powder was directly put into the mixing kettle without heating to mix with a product obtained in step (2) with a mixing time set to 10 s.

(4) A product obtained in step (3) was taken out of the kettle, then divided into 10 equal parts of samples (Y0, Y0.5, Y1, Y2, Y3, Y4, Y5, Y6, Y7, Y8) and stored in a special development bin at 170° C., wherein Y0 was developed for 0 h, Y0.5 was developed for 0.5 h, Y1 was developed for 1 h, Y2 was developed for 2 h, Y3 was developed for 3 h, Y4 was developed for 4 h, Y5 was developed for 5 h, Y6 was developed for 6 h, Y7 was developed for 7 h, and Y8 was developed for 8 h.

The completely developed mixture were taken out of the bin at 160° C. and molded into an asphalt mixture test piece at 160° C., and then the pavement performances of the mixture were tested For each sample obtained by the above preparation method of a plant-mixed warm regenerated asphalt mixture, the high-temperature performance (Marshall stability test, dynamic stability test), low-temperature performance (low-temperature bending test), water stability (Marshall residual stability test, freeze-thaw splitting test) and fatigue life (four-point bending fatigue life test) were evaluated respectively after the test pieces were molded indoors. The test results were shown in Table 23, Table 24, Table 25 and Table 26, respectively.

TABLE 23

High-temperature Performance Detection Results of Plant-mixed Warm Regenerated Asphalt Mixture

| Detection index | Plant-mixed warm regenerated asphalt mixture | | | | | | | | | |
|---|---|---|---|---|---|---|---|---|---|---|
|  | Y0 | Y0.5 | Y1 | Y2 | Y3 | Y4 | Y5 | Y6 | Y7 | Y8 |
| Marshall stability (KN) | 7.64 | 8.78 | 9.91 | 11.70 | 12.03 | 13.38 | 13.71 | 13.00 | 11.92 | 9.08 |
| Dynamic stability (times/mm) | 2750.4 | 3216.2 | 3490.5 | 3753.0 | 3972.4 | 4200.9 | 4375.1 | 4219.8 | 3590.1 | 3016.5 |

Remarks: Y0, Y0.5, Y1, Y2, Y3, Y4, Y5, Y6, Y7 and Y8 were the samples obtained after the plant-mixed warm regenerated asphalt mixture was developed at 170° C. for 0 h, 0.5 h, 1 h, 2 h, 3 h, 4 h, 5 h, 6 h, 7 h and 8 h respectively (the same below); it was stipulated in the "Technical Specification for Construction of Highway Asphalt Pavement" JTG F40-2004 (hereinafter referred to as the Specification) that the Marshall stability should be no less than 8 KN and the dynamic stability should be no less than 3000 times/mm.

TABLE 24

Low-temperature Performance Detection Results of Plant-mixed Warm Regenerated Asphalt Mixture

| Detection index | Plant-mixed warm regenerated asphalt mixture | | | | | | | | | |
|---|---|---|---|---|---|---|---|---|---|---|
|  | Y0 | Y0.5 | Y1 | Y2 | Y3 | Y4 | Y5 | Y6 | Y7 | Y8 |
| Maximum bending strain at failure (με) | 2158.2 | 2383.1 | 2509.5 | 2662.7 | 2818.9 | 2922.0 | 3000.4 | 2809.5 | 2290.8 | 1971.3 |

Remarks: the test temperature was −10° C., and it was stipulated in the Specification that the maximum bending strain at failure should be no less than 2,300 με.

TABLE 25

Water Stability Detection Results of Plant-mixed Warm Regenerated Asphalt Mixture

| Detection index | Plant-mixed warm regenerated asphalt mixture | | | | | | | | | |
|---|---|---|---|---|---|---|---|---|---|---|
|  | Y0 | Y0.5 | Y1 | Y2 | Y3 | Y4 | Y5 | Y6 | Y7 | Y8 |
| Marshall residual stability ratio (%) | 77.9 | 81.5 | 83.6 | 86.0 | 88.4 | 89.7 | 90.5 | 91.7 | 85.2 | 80.2 |
| Freeze-thaw splitting strength ratio (%) | 73.0 | 75.4 | 77.7 | 79.8 | 80.1 | 83.9 | 85.0 | 87.7 | 80.6 | 76.1 |

Remarks: it was stipulated in the Specification that the Marshall residual stability ratio should be no less than 80%, and the freeze-thaw splitting strength ratio should be no less than 75%.

TABLE 26

Fatigue Life Detection Results of Plant-mixed Warm Regenerated Asphalt Mixture

| Detection index | Plant-mixed warm regenerated asphalt mixture | | | | | | | | | |
|---|---|---|---|---|---|---|---|---|---|---|
|  | Y0 | Y0.5 | Y1 | Y2 | Y3 | Y4 | Y5 | Y6 | Y7 | Y8 |
| Four-point bending fatigue life (times) | 4890 | 5722 | 6605 | 7903 | 9986 | 10565 | 11286 | 13077 | 7109 | 3980 |

Remarks: the test temperature was 15° C., the target strain was 600 με, the loading frequency was 10 Hz, and the test termination condition was 50%.

Fourth Embodiment

Laboratory test embodiment: basically the same as the third embodiment, except that the development temperatures of the warm regenerated asphalt mixture in the embodiment were 20° C., 30° C., 40° C., 70° C., 100° C., 130° C., 150° C., 170° C., 190° C. and 210° C. respectively; and the development time was 6 h. The high-temperature performance, low-temperature performance, water stability and fatigue life of the plant-mixed warm regenerated asphalt mixture were investigated respectively at the development temperatures and development time described in the embodiment. The test results were shown in Table 27, Table 28, Table 29 and Table 30.

TABLE 27

High-temperature Performance Detection Results of Plant-mixed Warm Regenerated Asphalt Mixture

| Detection index | Plant-mixed warm regenerated asphalt mixture | | | | | | | | | |
|---|---|---|---|---|---|---|---|---|---|---|
| | 20° C. | 30° C. | 40° C. | 70° C. | 100° C. | 130° C. | 150° C. | 170° C. | 190° C. | 210° C. |
| Marshall stability (KN) | 8.22 | 8.29 | 10.71 | 11.10 | 12.83 | 13.36 | 14.57 | 14.50 | 13.10 | 7.54 |
| dynamic stability (times/mm) | 2676.1 | 2815.9 | 3209.8 | 3446.3 | 3722.7 | 4178.3 | 4399.6 | 4420.0 | 3400 | 2876 |

Remarks: the development time was 6 h (the same below); it was stipulated in the "Technical Specification for Construction of Highway Asphalt Pavement" JTG F40-2004 (hereinafter referred to as the Specification) that the Marshall stability should be no less than 8 KN and the dynamic stability should be no less than 3000 times/mm.

TABLE 28

Low-temperature Performance Detection Results of Plant-mixed Warm Regenerated Asphalt Mixture

| Detection index | Plant-mixed warm regenerated asphalt mixture | | | | | | | | | |
|---|---|---|---|---|---|---|---|---|---|---|
| | 20° C. | 30° C. | 40° C. | 70° C. | 100° C. | 130° C. | 150° C. | 170° C. | 190° C. | 210° C. |
| Maximum bending strain at failure (µε) | 1807.5 | 2307.1 | 2617.9 | 2790.3 | 2851.4 | 2922.0 | 2931.0 | 2807.0 | 2300.8 | 1623.9 |

Remarks: the test temperature was −10° C., and it was stipulated in the Specification that the maximum bending strain at failure should be no less than 2,300 µε.

TABLE 29

Water Stability Detection Results of Plant-mixed Warm Regenerated Asphalt Mixture

| Detection index | Plant-mixed warm regenerated asphalt mixture | | | | | | | | | |
|---|---|---|---|---|---|---|---|---|---|---|
| | 20° C. | 30° C. | 40° C. | 70° C. | 100° C. | 130° C. | 150° C. | 170° C. | 190° C. | 210° C. |
| Marshall residual stability ratio (%) | 76.4 | 81.3 | 83.2 | 85.1 | 87.7 | 88.5 | 89.6 | 87.5 | 80.0 | 73.9 |
| Freeze-thaw splitting strength ratio (%) | 71.3 | 71.9 | 76.8 | 79.1 | 81.4 | 82.5 | 84.3 | 85.1 | 78.6 | 70.0 |

Remarks: it was stipulated in the Specification that the Marshall residual stability ratio should be no less than 80%, and the freeze-thaw splitting strength ratio should be no less than 75%.

TABLE 30

Fatigue Life Detection Results of Plant-mixed Warm Regenerated Asphalt Mixture

| Detection index | Plant-mixed warm regenerated asphalt mixture | | | | | | | | | |
|---|---|---|---|---|---|---|---|---|---|---|
| | 20° C. | 30° C. | 40° C. | 70° C. | 100° C. | 130° C. | 150° C. | 170° C. | 190° C. | 210° C. |
| Four-point bending fatigue life (times) | 4556 | 4890 | 6165 | 8105 | 8926 | 9741 | 12337 | 13022 | 9104 | 4663 |

Remarks: the test temperature was 15° C., the target strain was 600 µε, the loading frequency was 10 Hz, and the test termination condition was 50%.

From the pavement performance data of the plant-mixed warm regenerated asphalt mixtures obtained in the first and third embodiments, it can be seen that under the same development temperature, with the extension of the development time, the high-temperature performance of the mixture increases first and then decreases, when the development time is greater than 6 h, the high-temperature performance decreases rapidly, and when the development time is less than 0.5 h, the dynamic stability of the mixture rutting test does not meet the specification requirements; the low-temperature performance of the mixture increases first and then decreases, when the development time is less than 0.5 h, the maximum bending strain of the low-temperature bending test of the mixture does not meet the specification requirements, and the low-temperature performance decays rapidly after the development time is greater than 6 h; the water stability of the mixture increases first and then decreases, when the development time is less than 0.5 h, the water stability of the mixture cannot meet the specification requirements, when the development time is greater than 6 h, the water stability decreases rapidly; and the fatigue life of the mixture increases first and then decreases, when the development time is greater than 6 h, the four-point bending fatigue life decreases rapidly.

With reference to the above test results, it can indicate that the development process of the recycled regenerated asphalt mixture significantly increases the opportunities for mutual permeation, fusion and organic binding between the new asphalt and the old asphalt, enables the new asphalt and the regenerant to fully exert renascence and reconstruction functions in the recycled asphalt pavement material (RAP material), and improves the recycling effect of the old asphalt, and pavement performances of the recycled regenerated asphalt mixture formed can fully reach that of a hot-mixed asphalt mixture produced entirely with new materials. Particularly, the low-temperature crack resistance, water damage resistance and fatigue life of the hot-mixed asphalt mixture are significantly better than that of the recycled regenerated asphalt mixture produced by the conventional technologies. However, with the increase of the development time to a certain extent, the hot warm recycled regenerated asphalt mixture is under a high temperature status for a long time, while the aging of the recycled regenerated asphalt binder therein is accelerated again, the aromatic components and saturated phenol in the asphalt will volatilize, the asphalt become hard and brittle, the viscosity of the asphalt will decrease and the flexibility of the asphalt will decrease, so that the low-temperature performance, water stability and fatigue life of the mixture reduce greatly and quickly, and the high-temperature performance begin to decrease obviously. Therefore, the development process of the hot warm recycled regenerated asphalt mixture has a specific time limit.

From the pavement performance data of the plant-mixed warm regenerated asphalt mixtures obtained in the second and fourth embodiments, it can be seen that under the same development time, with the increase of the development temperature, the high-temperature performance, low-temperature performance, water stability and fatigue life of the mixture increase first and then decrease. When the temperature is low, the opportunity degrees for mutual permeation, fusion and organic binding between the new asphalt and the old asphalt are slow when the temperature are slow, so that the renascence and reconstruction functions of the new asphalt and the regenerant in the recycled asphalt pavement material (RAP material) are decreased, and the recycling effect of the old asphalt is poor; therefore, the comprehensive pavement performances of the mixture cannot reach that of a hot-mixed asphalt mixture produced entirely with new materials. However, with the increase of the development temperature, the aging of the regenerated asphalt binder in the warm regenerated asphalt mixture is accelerated, the light components such as aromatic components and saturated phenol in the asphalt volatilize, the asphalt become hard and brittle, the viscosity of the asphalt reduce and the flexibility of the asphalt decrease, so that the high-temperature performance, the low-temperature performance, the water stability and the fatigue life of the mixture decrease greatly and quickly. Therefore, the development process of the warm regenerated asphalt mixture has a specific temperature limit.

According to the above test data, the optimal development temperature of the plant-mixed warm regenerated asphalt mixture prepared by the method of first heating and then mixing according to the present invention is 150° C. and the optimal development time is 5 h; and the optimal development temperature of the plant-mixed warm regenerated asphalt mixture prepared by the method of first mixing and then heating according to the present invention is 150° C. and the optimal development time is 6 h.

What is claimed is:

1. A preparation method of a plant-mixed warm regenerated asphalt mixture, comprising the following steps of:
   (1) preparing a RAP material, an aggregate, a mineral powder, a new asphalt and a regenerant with a total mass percentage of 100%, wherein the aggregate is obtained by screening aggregates with four groups of particle sizes, the first group of particle sizes is less than 2.36 mm; the second group of particle sizes is 2.36 to 4.75 mm; the third group of particle sizes is more than 4.75 to 9.5 mm; and the fourth group of particle sizes is more than 9.5 to 16.0 mm;
   (2) heating and stirring the RAP material, adding the regenerant, and then continuing to heat and stir, wherein the regenerant comprises a density of 1.017 g/cm$^3$ at 20° C.; a flash point of 259.5° C.; a kinematic viscosity of 60000 mm$^2$/s at 60° C.; a water content (v/v) of 0.13%; an aromatic content (m) of 86.21%; a resin, asphaltene content (m) of 11.01%; and a furfural content of 0.11 mg/kg;
   (3) placing a product of step (2) in a development bin for development, wherein a development temperature is 40° C. to 150° C., and a development time is 0.5 h to 6 h;
   (4) mixing, heating and stirring a product of step (3) with the aggregate; and
   (5) mixing and heating a product of step (4) with the asphalt, adding the mineral powder, stirring, and placing a mixture comprising the asphalt and the mineral powder in a mold.

2. A preparation method of a plant-mixed warm regenerated asphalt mixture, comprising following steps of:
   (1) preparing an RAP material, an aggregate, a mineral powder, an asphalt and a regenerant with a total mass percentage of 100%, wherein the aggregate is obtained by screening aggregates with four groups of particle sizes, the first group of particle sizes is less than 2.36 mm; the second group of particle sizes is 2.36 to 4.75 mm; the third group of particle sizes is more than 4.75 to 9.5 mm; and the fourth group of particle sizes is more than 9.5 to 16.0 mm;
   (2) mixing and stirring the RAP material and the aggregate which are respectively heated;
   (3) adding the regenerant and the asphalt into a product of step (2), and mixing, heating and stirring, wherein the regenerant comprises a density of 1.017 g/cm$^3$ at 20° C.; a flash point of 259.5° C.; a kinematic viscosity of 60000 mm$^2$/s at 60° C.; a water content (v/v) of 0.13%; an aromatic content (m) of 86.21%; a resin, asphaltene content (m) of 11.01%; and a furfural content of 0.11 mg/kg;
   (4) adding the mineral powder into a product of step (3), and mixing and stirring; and
   (5) placing a product of step (4) in a development bin for development, and then taking out of the bin for molding, wherein a development temperature is 40° C. to 170° C., and a development time is 0.5 h to 6 h.

3. The preparation method of the plant-mixed warm regenerated asphalt mixture according to claim 1, wherein the development bin comprises a storage bin, and a stirrer and a heater arranged therein, a volume of the storage bin is 1 to 5000 tons, and a heating method of a heater is one of a heat-transfer oil, an electric heating, or flue discharges of an asphalt mixing plant.

4. The preparation method of the plant-mixed warm regenerated asphalt mixture according to claim 1, wherein the RAP material is 20 to 85%, the new aggregate is 10 to 70%, the mineral powder is 0.9 to 8%, the new asphalt is 0.5 to 5% and the regenerant is 0.21 to 0.5% by the mass percentage.

5. The preparation method of the plant-mixed warm regenerated asphalt mixture according to claim 1, wherein in step (2), a temperature of the heating of the RAP material is 70 to 160° C., and a time of the stirring is 5 to 10 s.

6. The preparation method of the plant-mixed warm regenerated asphalt mixture according to claim 1, wherein in step (2), after the regenerant is added, a temperature of the heating is 40 to 120° C., and a time of the stirring is 15 to 25 s.

7. The preparation method of the plant-mixed warm regenerated asphalt mixture according to claim 1, wherein in step (4), a temperature of the heating is 90 to 190° C., and a time of the stirring is 10 to 15 s.

8. The preparation method of the plant-mixed warm regenerated asphalt mixture according to claim 1, wherein in step (5), a temperature of the heating is 60 to 160° C., and a time of the stirring is 15 to 25 s.

9. The preparation method of the plant-mixed warm regenerated asphalt mixture according to claim 2, wherein in step (2), a temperature of the heating of the RAP material is 80 to 170° C., a temperature of the heating of the aggregate is 90 to 190° C., and a time of the stirring is 15 to 25 s.

10. The preparation method of the plant-mixed warm regenerated asphalt mixture according to claim 2, wherein in step (3), a temperature of the heating is 40 to 120° C., and a time of the stirring is 15 to 30 s.

11. The preparation method of the plant-mixed warm regenerated asphalt mixture according to claim 2, wherein in step (4), a time of the stirring is 10 to 20 s.

12. A plant-mixed warm regenerated asphalt mixture prepared by the preparation method of the plant-mixed warm regenerated asphalt mixture according to claim 1.

13. The preparation method of the plant-mixed warm regenerated asphalt mixture according to claim 2, wherein the development bin comprises a storage bin, and a stirrer and a heater arranged therein, a volume of the storage bin is 1 to 5000 tons, and a heating method of a heater is one of a heat-transfer oil, an electric heating, or flue discharges of an asphalt mixing plant.

14. The preparation method of the plant-mixed warm regenerated asphalt mixture according to claim 2, wherein the RAP material is 20 to 85%, the aggregate is 10 to 70%, the mineral powder is 0 to 8%, the asphalt is 0.5 to 5% and the regenerant is 0 to 0.5% by the mass percentage.

15. A plant-mixed warm regenerated asphalt mixture prepared by the preparation method of the plant-mixed warm regenerated asphalt mixture according to claim 2.

* * * * *